US006574813B2

(12) United States Patent
Bolden et al.

(10) Patent No.: US 6,574,813 B2
(45) Date of Patent: Jun. 10, 2003

(54) AIR FLUIDIZED BED

(75) Inventors: Michael V. Bolden, Charleston, SC (US); Vincent L. Babson, Goose Creek, SC (US); Daniel A. Denson, Summerville, SC (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 09/997,630

(22) Filed: Nov. 29, 2001

(65) Prior Publication Data

US 2002/0032929 A1 Mar. 21, 2002

Related U.S. Application Data

(62) Division of application No. 09/567,671, filed on May 9, 2000, now Pat. No. 6,353,948, which is a division of application No. 08/993,183, filed on Dec. 18, 1997, now Pat. No. 6,073,289.

(51) Int. Cl.[7] .......................... F16K 31/126; A61G 7/00

(52) U.S. Cl. .................... 5/689; 5/702; 5/713; 137/510

(58) Field of Search ............................ 5/689, 702, 911, 5/912, 611, 713, 726; 137/251

(56) References Cited

U.S. PATENT DOCUMENTS

| | | | |
|---|---|---|---|
| 2,544,924 | A | 3/1951 | Herold |
| 3,686,696 | A | 8/1972 | Lanigan |
| 4,349,938 | A | 9/1982 | Fontana |
| 4,481,686 | A | 11/1984 | Lacoste |
| 4,483,029 | A | 11/1984 | Paul |
| 4,556,198 | A | 12/1985 | Tominaga |
| 4,637,083 | A | 1/1987 | Goodwin |
| 4,745,647 | A | 5/1988 | Goodwin |
| 4,768,249 | A | 9/1988 | Goodwin |
| 4,768,250 | A | 9/1988 | Kato |
| 4,798,227 | A | 1/1989 | Goodwin |
| 4,835,802 | A | 6/1989 | Purcey et al. |
| 4,838,309 | A | 6/1989 | Goodwin |
| 4,879,777 | A | 11/1989 | Goodwin |
| 4,914,760 | A | 4/1990 | Hargest et al. |
| 4,935,968 | A | 6/1990 | Hunt et al. |
| 4,942,635 | A | 7/1990 | Hargest et al. |
| 4,944,060 | A | 7/1990 | Peery et al. |
| 4,986,738 | A | 1/1991 | Kawasaki et al. |
| 5,074,000 | A | 12/1991 | Soltani et al. |

(List continued on next page.)

FOREIGN PATENT DOCUMENTS

| | | |
|---|---|---|
| EP | 0332242 | 11/1989 |
| GB | 2272368 | 5/1994 |
| WO | WO 91/18578 | 12/1991 |

*Primary Examiner*—Michael F. Trettel
(74) *Attorney, Agent, or Firm*—Barnes & Thornburg

(57) ABSTRACT

A pilot operated check valve is configured to be positioned inside a fluid supply tube connected between an air supply manifold and an air zone located on a support surface of abed. The pilot operated check valve includes a body having an air inlet and an air outlet connected by an air passageway. The pilot operated check valve also includes a valve member configured to move between an open position and a closed position to block air flow through the passageway. Additionally, the pilot operated check valve includes a push rod having a first end coupled to the valve member to unseat the valve member when the valve member is in its open position and a second end. The pilot operated check valve includes a diaphragm located in a chamber of the body adjacent the second end of the push rod. The pilot operated check valve further includes an inlet port configured to be coupled to the manifold to admit pressure against the diaphragm. The body is formed to include a vent hole located on an opposite of the diaphragm from the inlet port. The vent hole is formed in communication with the chamber to permit air passing into the chamber from the air passage-way to vent to atmosphere.

1 Claim, 6 Drawing Sheets

U.S. PATENT DOCUMENTS 5,165,141 A 11/1992 Soltani
5,183,074 A * 2/1993 Reese ......................... 137/488
5,243,723 A 9/1993 Cotner et al.
5,272,778 A 12/1993 Gore
5,320,187 A 6/1994 Pressley et al.
5,351,364 A 10/1994 Zun
5,394,576 A 3/1995 Soltani et al.
5,402,542 A 4/1995 Viard
5,454,399 A 10/1995 Kazakis et al.
5,539,943 A 7/1996 Romano
5,586,346 A 12/1996 Stacy et al.
5,623,736 A 4/1997 Soltani et al.
6,073,289 A * 6/2000 Bolden et al. ................. 5/689
6,152,169 A * 11/2000 Flick .......................... 137/510
6,302,145 B1 * 10/2001 Ellis et al. ............... 137/596.2
2001/0032947 A1 * 10/2001 Freisinger et al. ....... 251/30.03

* cited by examiner

AIR FLUIDIZED BED

CROSS-REFERENCE TO RELATED APPLICATIONS

This application is a division of U.S. Ser. No. 09/567,671 filed May 9, 2000, now U.S. Pat. No. 6,353,948, U.S. Ser. No. 09/567,671 which is itself a division of U.S. Ser. No. 08/993,183, Dec. 18, 1991 now U.S. Pat. No. 6,073,289. U.S. Ser. Nos. 08/993,183 and 09/567,671 are assigned to the same assignee as this application.

BACKGROUND AND SUMMARY OF THE INVENTION

The present invention relates to inflatable and air fluidized support surfaces for beds. More particularly, the present invention relates to a bed having both air bladders and at least one air fluidized section for supporting a patient which can be easily transported and maneuvered between a very low position in which the support surface is located close to the floor to facilitate patients getting into and out of the bed.

Air fluidized beds have been used as patient support systems. In this type of bed, a fluidizable medium such as tiny spheres formed of glass, ceramics, or silicone is contained within a suitable support and fluidized by air passing through the support mechanism to support the patient. In a common design, the fluidizable medium is supported by a diffuser board which is permeable to air but impermeable to the fluidizable medium. A retaining mechanism which is impermeable to air is positioned around outer edges of the diffuser board. A flexible cover encloses the fluidizable medium and is permeable only to air flow.

Fluidized beds provide an excellent support surface for patients to help prevent formation of bed sores because of the equal distribution of pressure on the support surface. In addition, fluidized beds are well suited for treatment of patients with skin grafts because the fluidized support surface does not produce high shear, frictional forces when the patient moves on the bed.

The present invention includes a modular inflatable and air fluidized bed assembly. The support surfaces of the present invention are similar to those disclosed in U.S. Pat. No. 5,623,736 owned by the assignee of the present application, the specification of which is incorporated herein by reference.

A problem associated with air fluidized beds involves maintaining the temperature of the air fluidized section of the bed below a desired level. The present invention provides an improved cooling mechanism for air flow from a blower through the air fluidized section of the support surface.

According to one aspect of the present invention, a diffuser assembly is provided for supporting a fluidizable medium on a fluidized bed. The diffuser assembly includes a diffuser board which is permeable to air and impermeable to the fluidizable medium, and a metal plate coupled to the diffuser board. The metal plate is formed to include a plurality of apertures therein to permit air to pass through the metal plate.

In the illustrated embodiment, the apparatus includes a ground conductor having a first end coupled to the metal plate and a second end coupled to ground to provide a ground plane. The illustrated metal plate has an outer perimeter edge. The plurality of apertures are spaced inwardly from the outer perimeter edge of the metal plate by a predetermined distance to define a solid border configured to block air flow through the metal plate adjacent the outer perimeter edge. The illustrated fluidized section of the bed includes an outer inflatable portion defining a boundary of the air fluidized section. The predetermined distance is selected so that the air flow through the apertures of the metal plate is spaced inwardly from the outer inflatable boundary of the fluidized bed.

In one illustrated embodiment, a first metal plate is coupled to a top surface of the diffuser board and a second metal plate is coupled to a bottom surface of the diffuser board. The second metal plate is also formed to include a plurality of apertures to permit air to pass through the second metal plate. The first and second metal plates each have an outer perimeter edge. The plurality of apertures are spaced inwardly from the outer perimeter edges of the first and second metal plates by a predetermined distance to define a solid border configured to block air flow through the first and second metal plates adjacent the outer perimeter edges.

According to another aspect of the present invention, a bed includes at least one air fluidized section. The bed also includes a base configured to support air flow control components including at least one of a blower assembly and an electronic controller configured to control air flow to the at least one fluidized section of the bed. The base has a width dimension. The bed also includes a frame configured to support the at least one fluidized section. The frame has first and second support frame members which are spaced apart by a distance greater than the width dimension of the base. The bed further includes a lifting mechanism coupled between the frame and the base. The lifting mechanism is configured to move the frame between an elevated position and a low position in which the first and second frame members pass over the air flow components on the base to permit the frame to be moved to a low position relative to the ground.

In the illustrated embodiment, the lifting mechanism includes a first support member pivotably coupled to the base and slidably coupled to the frame, a second support member pivotably coupled to the frame and slidably coupled to the base, and an actuator configured to move the first and second frame members to lift the frame relative to the base. The actuator includes at least one hydraulic cylinder. The illustrated bed also includes at least one air bladder located adjacent the at least one air fluidized section on the frame.

According to yet another aspect of the present invention, a bed includes a patient support surface having an air zone, a blower configured to supply air to the air zone, and a main heat exchanger coupled between the blower and the air zone. The main heat exchanger is configured to remove heat from air supplied by the blower to the air zone. The bed also includes an auxiliary heat exchanger coupled between the blower and the main heat exchanger.

In the illustrated embodiment, the auxiliary heat exchanger includes a body portion configured to define an air flow path and a plurality of heat exchange fins extending from the body portion. A first set of heat exchange fins extends outwardly from the body portion of the auxiliary heat exchanger, and a second set of heat exchange fins extends inwardly from the body portion into the air flow path. The body portion and the fins are illustratively made from a metal material.

In one illustrated embodiment, a housing surrounds the body portion of the auxiliary heat exchanger, and a fan is configured to blow air over the body portion. In another illustrated embodiment, at least one fan is coupled to the fins of the auxiliary heat exchanger to blow air over the outwardly extending fins. At least one fin is formed to include a mounting portion configured to receive a fastener to secure the fan directly to the heat exchanger.

A heater is located in an air flow passageway between the blower and the air zone of the bed. The bed further includes a controller coupled to the main heat exchanger, the auxiliary heat exchanger, and the heater to control the temperature of the air zone.

According to a further aspect of the present invention, a caster locking apparatus is provided for a caster that is rotatably mounted to a bed frame member by a support including a notched portion. The locking apparatus includes a housing coupled to the caster. The housing includes an interior region having a top opening located adjacent the notched portion of the support, and first and second notched portions spaced apart from the top opening. The first notched portion is located a first distance from the top opening of the housing, and the second notched portion is located a second distance from the top opening of the housing. The second distance is less than the first distance. The apparatus also includes a locking pin located within the interior region of the housing, a spring configured to bias the locking pin upwardly into the notched portion of the frame to prevent rotation of the caster relative to the frame member, and a stop coupled to the pin. The pin and stop are movable from a first position in which the stop is located within the first notched portion of the housing to compress the spring and remove the pin from the notched portion of the frame to permit rotation of the caster relative to the frame, and a second position in which the stop is located in the second notched portion of the housing to permit the spring to bias the pin upwardly into the notched portion of the frame and lock the caster relative to the frame member.

According to a still further aspect of the present invention, a pilot operated check valve is configured to be positioned inside a fluid supply tube connected between an air supply manifold and an air zone located on a support surface of a bed. The pilot operated check valve apparatus includes a body having an air inlet and an air outlet connected by an air passageway. The apparatus also includes a valve member configured to move between an open position and a closed position to block air flow through the passageway, a push rod having a first end coupled to the valve member to unseat the valve member when the valve member is in its open position and a second end, a diaphragm located in a chamber of the body adjacent the second end of the push rod, and an inlet port configured to be coupled to the manifold to admit pressure against the diaphragm. The body is formed to include a vent hole located on an opposite of the diaphragm from the inlet port. The vent hole is formed in communication with the chamber to permit air passing into the chamber from the air passageway to vent to atmosphere.

Additional objects, features, and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

A detailed description particularly refers to the accompanying figures in which.

DETAILED DESCRIPTION OF THE DRAWINGS

Figure 1:
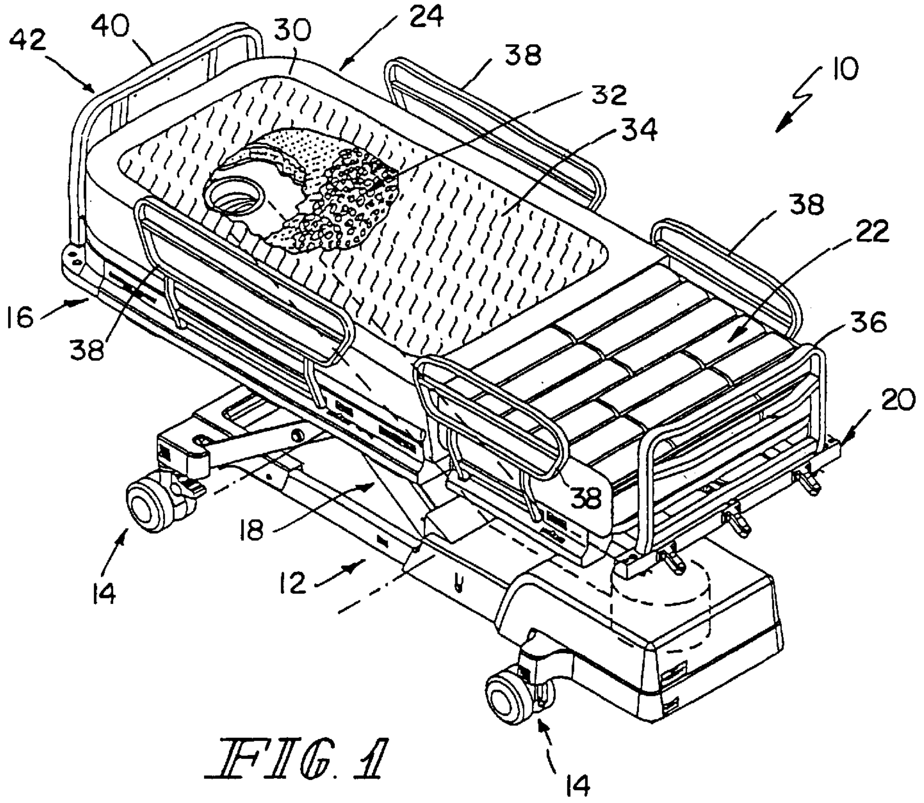
FIG. 1 is a perspective view of the bed of the present invention which includes an air fluidized section and air bladders located adjacent the air fluidized section for supporting a patient.

Referring now to the drawings, FIG. 1 illustrates a bed 10 of the present invention which includes a base 12 having a plurality of casters 14. A frame 16 is coupled to the base 12 by a lifting mechanism 18 discussed below. Frame 16 includes an upper articulatable head section 20 which can be raised and lowered to elevate a patient's head. A plurality of inflatable air bladders 22 are located above head frame section 20. Air bladders 22 support an upper portion of a patient.

The bed 10 also includes an air fluidized patient support section 24 which does not articulate. Fluidized section 24 is configured to support a lower portion of the patient's body with a fluidized medium which forms a portion of the patient support surface. A pair of inflatable rings 26 and 28 best shown in FIGS. 4 and 5 form an outer border 30 of fluidized section 24. The rings 26 and 28 are formed from a material impermeable to air. Therefore, the ring bladders 26 and 28 form part of the containment system for holding a fluidizable medium 32 within the fluidized section 24 of bed 10. An air permeable sheet 34 is secured to frame assembly 16 to cover and contain the fluidizable medium 32. Suitable means is provided for fastening the sheet 34 to the frame 16, as is well known to those skilled in the art. Further details of the general structure of inflatable air bladders 22 and air fluidized section 24 are disclosed in U.S. Pat. No. 5,623,736, owned by the assignee of the present application, the disclosure of which is incorporated herein by reference.

The bed 10 also includes a headboard 36, a plurality of siderails 38, and a footboard 40. A control panel 42 on the footboard 40 is used to control air flow to the air support bladders, to move the head section 20 of frame 16 between an upwardly angled position and a horizontal position, and to move the frame 16 of bed 10 between its low position and its elevated position.

Figure 2:
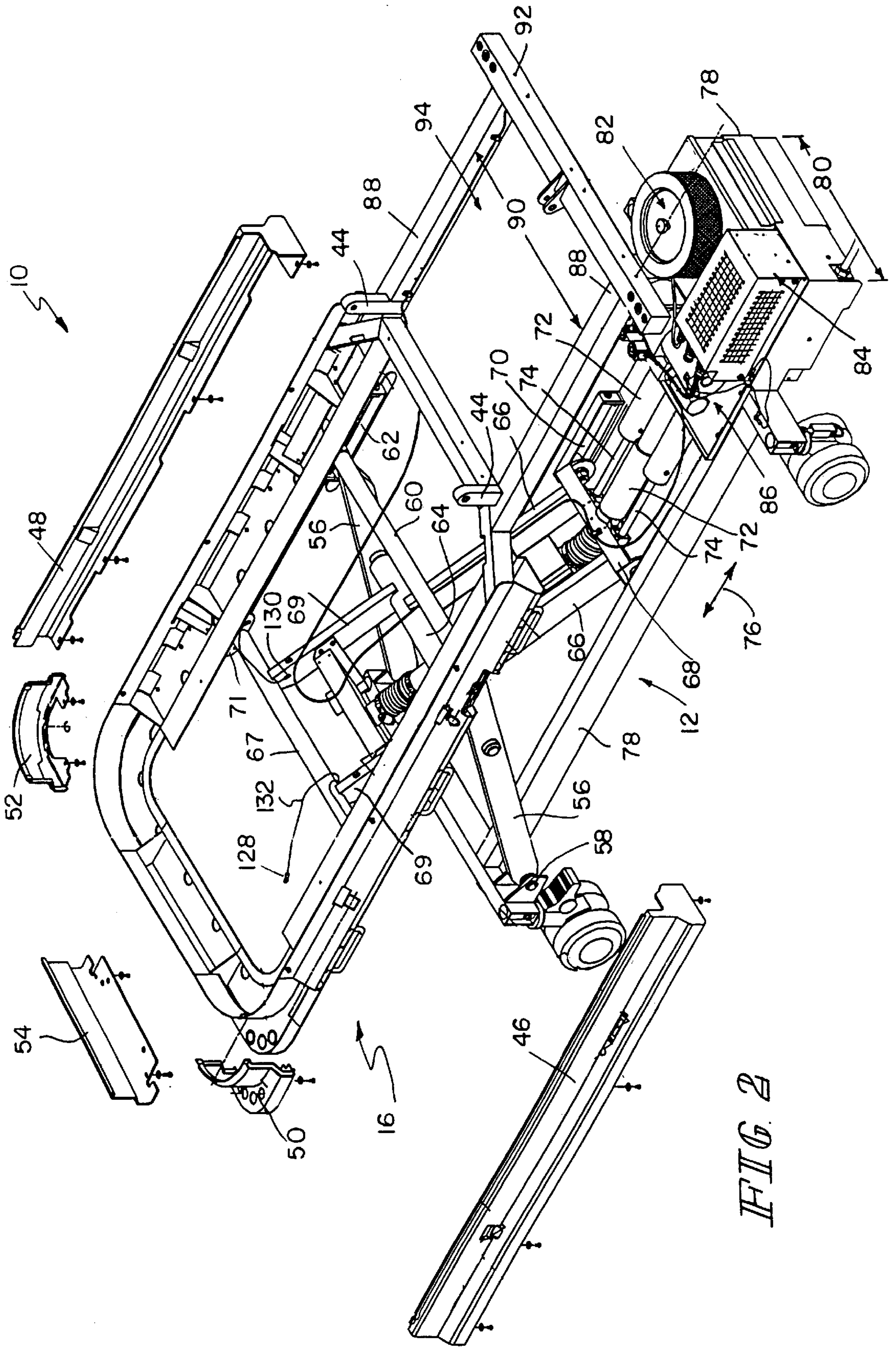
FIG. 2 is an exploded perspective view illustrating frame members of the bed of the present invention which are configured to permit a patient support surface of the bed to be moved from an elevated position to a very low position adjacent the ground.

FIG. 2 illustrates further details of the frame assembly 16 of bed 10. The articulating head frame section 20 is not shown in FIG. 2. The articulating head section 20 is coupled to supports 44. Side panels 46 and 48 are coupled to opposite sides of frame 16 with suitable fasteners to provide support for the fluidized section 24. Corner sections 50 and 52, and end section 54 are also coupled to frame 16 with suitable fasteners to provide support for the fluidized section 24.

Lifting mechanism 18 includes first arms 56 pivotably coupled to base 12 at locations 58. Opposite ends of first arms 56 are coupled to a tube 60 which slides back and forth within tracks 62 on opposite sides of frame 16 Frame arms 56 are also pivotably coupled to a center bar 64. Center bar 64 is rigidly coupled to second arms 66. Opposite ends of second arms 66 are connected to a sliding mechanism 68 which slides within tracks 70 coupled to base 12. Arms 69 have a first ends pivotably coupled to frame 16 by bar 67 at locations 71. Second ends of arms 69 are rigidly coupled to bar 64. Two drive cylinders 72 are coupled to base 12. Pistons 74 are coupled to the sliding mechanism 68 to move the sliding mechanism 68 back and forth within track 70 in the directions of double headed arrow 76.

Base 12 includes frame members 78 which are spaced apart a first distance 80. Frame members 78 support a blower 82, electronic controller 84, and a plurality of flow control valves 86 within a footprint defined by distance 80 between frame members 78. Frame 16 includes side frame members 88 which are spaced apart by distance 90 which is greater than the distance 80 of spacing between frame members 78 of base 12. An end frame member 92 extends between side frame members 88. Side frame members 88 and end frame member 92 form an open window 94 which is large enough to pass over blower 82, electronic controller 84, valves 86 which are supported between frame members 78 of base 12. Because a portion of frame 16 moves over the blower 82, controller 84, and valves 86, the frame 16 can be moved to a lower position when pistons 74 are retracted. Illustratively, frame 16 can be moved to within 15.6 inches of the ground measured from the bottom surface of frame member 88.

Figure 3:
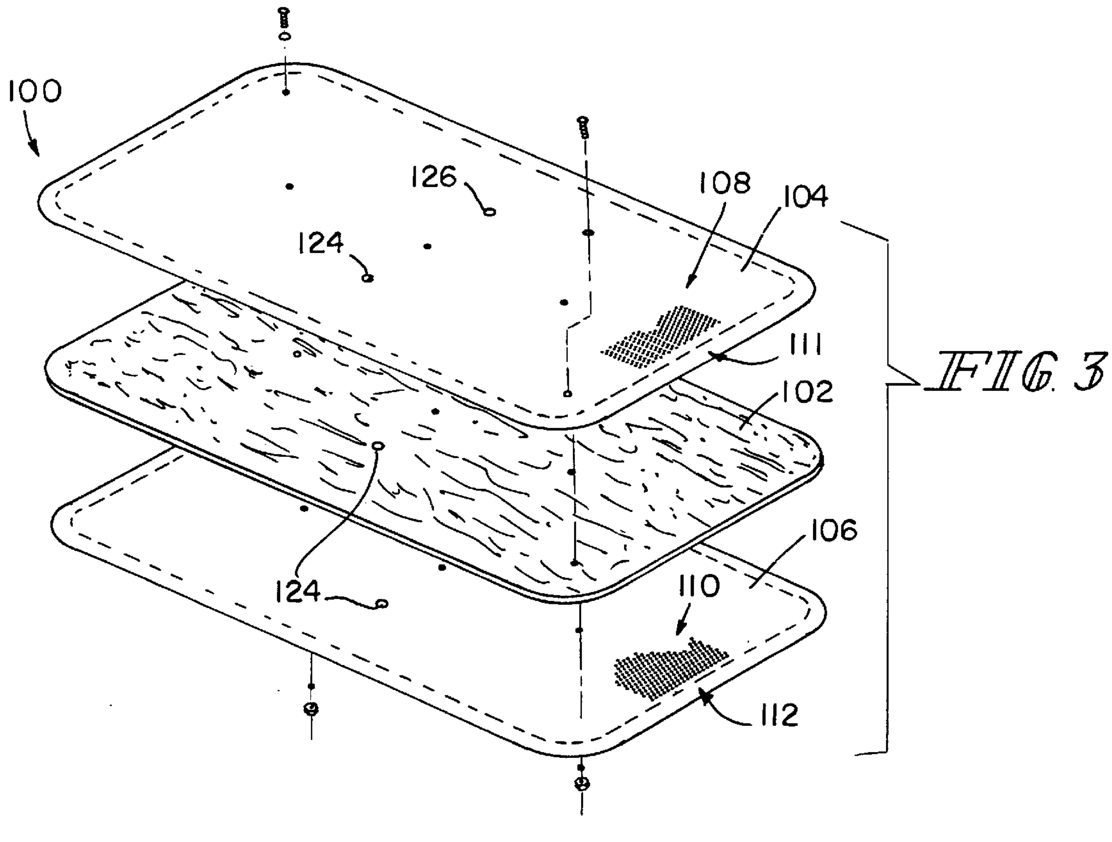
FIG. 3 is an exploded perspective view of an improved diffuser assembly for the air fluidized section of the present invention.

A diffuser assembly 100 of the present invention is illustrated in FIG. 3. Diffuser assembly 100 includes a diffuser board 102 which is permeable to air but impermeable to the fluidized medium 32 which, in the preferred embodiment, comprises tiny beads or micro spheres made from glass, ceramics, or silicone. Diffuser board 102 is located between first and second perforated metal plates 104 and 106, respectively. Metal plates 104 and 106 are formed to include a plurality of apertures 108 and 110 which illustratively cover substantially the entire plates 104 and 106. Apertures 108 and 100 do not extend completely to the edge of plates 104 and 106, as illustrated in FIG. 3. There is a solid border 111 and 112 around the outer perimeter of plates 104 and 106, respectively.

Figure 4:
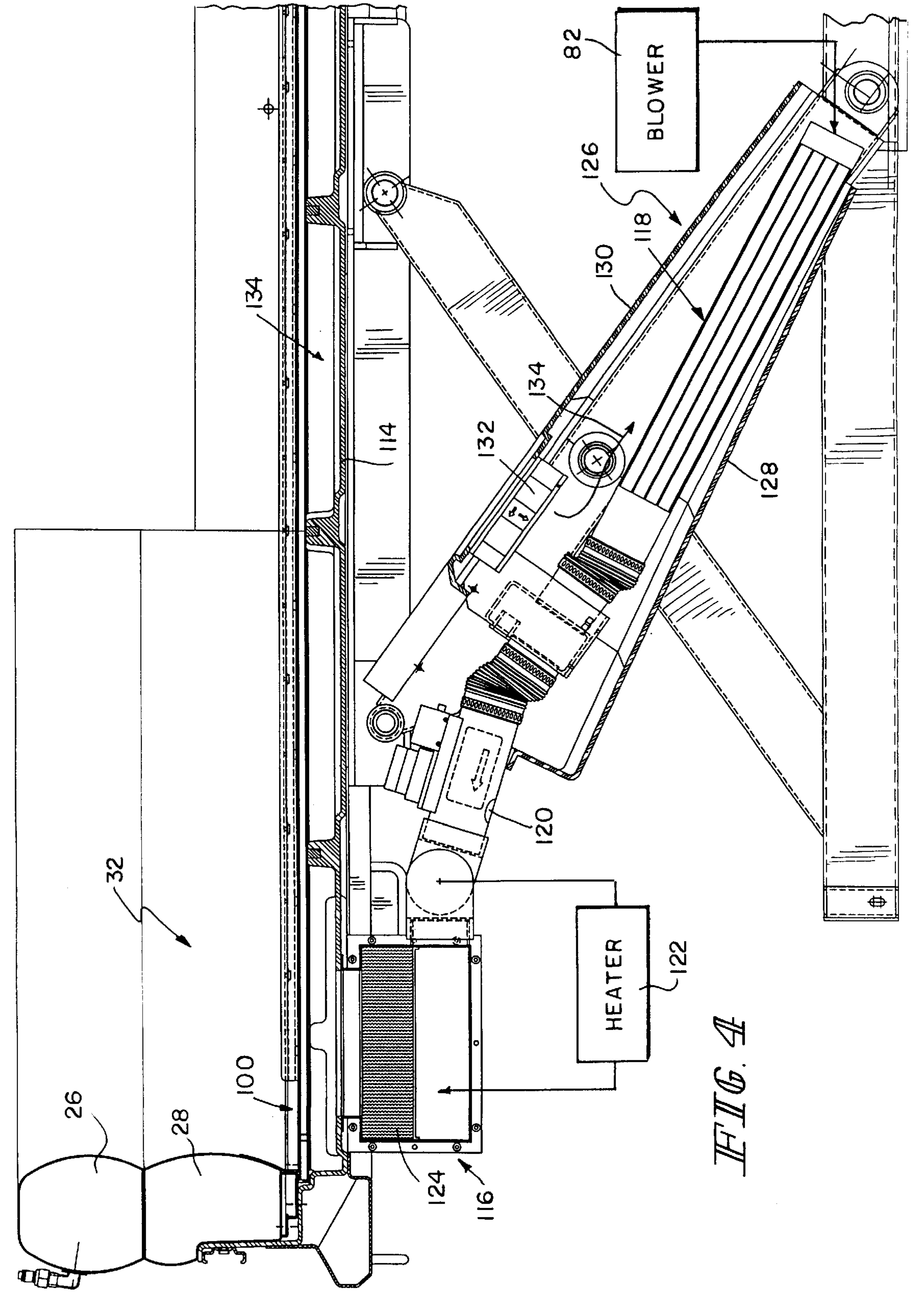
FIG. 4 is a partial sectional view taken through the bed of the present invention illustrating the diffuser board assembly mounted on a deck of the bed and illustrating a main heat exchanger and an auxiliary heat exchanger to cool air entering into the air fluidized section from a blower.
Figure 5:
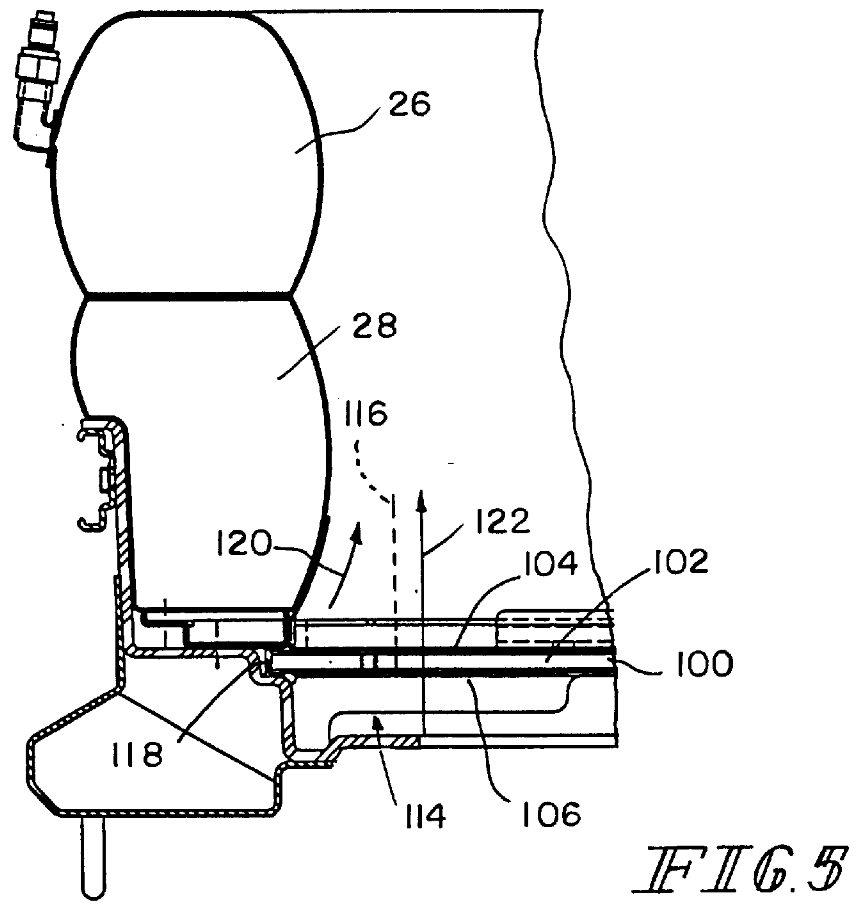
FIG. 5 is an enlarged view of a portion of the patient support deck, the diffuser board assembly, and the air fluidized section.

FIG. 4 illustrates the diffuser assembly 100 mounted on a base 114 of bed 10 coupled to frame 16. Apertures 108 and 110 in metal plates 104 and 106 begin at about location 116 spaced apart from an end edge 118 of the diffuser assembly 100 as best shown in FIG. 5. Use of only a standard diffuser board causes air to pass up along the side of bladder 28 in the direction of arrow 120 to create high air velocity air and "bubbling" adjacent the border 30 of the fluidized section 24. The borders 111 and 112 of solid material on plates 104 and 106, respectively, before apertures 108 and 110 begin limits air flow immediately adjacent bladders 28 and 26. This provides more even fluidization as air moves upwardly in the direction of arrows 112 through the diffuser assembly 100.

The diffuser assembly 100 also provides a ground plane for the air fluidized section 24. This facilitates discharge of static electricity which is generated by the fluidized section. At least one of the plates 104 and 106 is coupled to ground. The plates 104 and 106 are electrically coupled together. Although two metal plates 104 and 106 are shown, it is understood that a single metal plate 104 or 106 may be used in accordance with certain aspects of the present invention.

Apertures 124 and 126 are formed in diffuser board 102 and plates 104 and 106. Temperature sensors 128 and 130 shown in FIG. 2 extend upwardly through apertures 124 and 126. Sensor 128 is illustratively a temperature probe coupled to electronic controller 84 by wire 132 to regulate the temperature of the fluidized medium up to about 102° F. Sensor 130 is a hardware backup sensor independent of the controller 84 which is configured to deactivate the fluidizing system if the temperature exceeds a predetermined maximum level of about 108° F.

Air is supplied from blower 82 to a plenum 134 located between diffuser assembly 100 and base 114. A main heat exchanger 116 is coupled to base 114 as illustrated in FIG. 4. Air is supplied from blower 82 through an auxiliary heat exchanger 118, through connector 120. Connector 120 is coupled to a supply line which includes an optional heater 122 and heat exchanger 116. Typically, air is heated due to operation of blower 82. Therefore, the main heat exchanger 116 is used to extract heat from the air using liquid in coils 124 or other suitable techniques.

Because cooling of the blower air is important to operation of the fluidized section 24, the present invention provides an auxiliary heat exchanger 118 through which air flows prior to reaching the main heat exchanger 116. Auxiliary heat exchanger 118 is surrounded by a housing 126 including a bottom housing portion 128 and a top housing portion 130. A fan 132 is coupled to top housing portion 130. Fan 132 is configured to blow air in the direction of arrow 134 over auxiliary heat exchanger 118 to provide initial cooling of the air from blower 82 before the air from blower 82 reaches the main heat exchanger 116.

Figure 6:
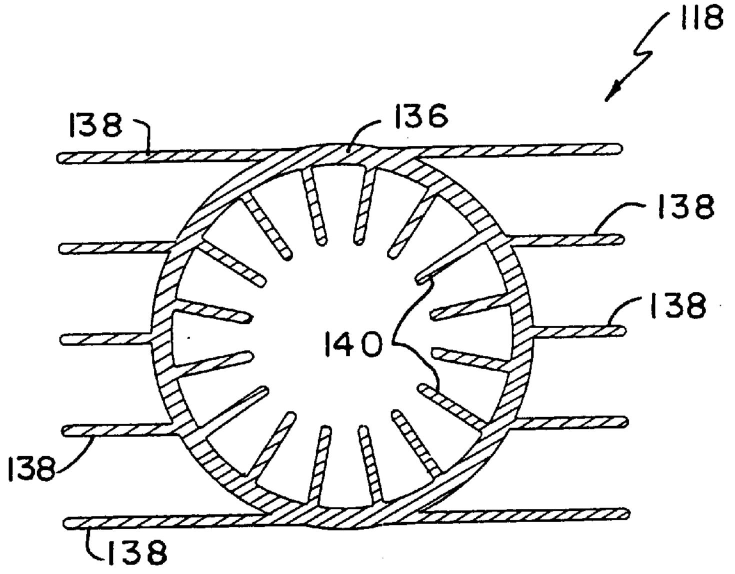
FIG. 6 is a sectional view taken through a body portion of the auxiliary heat exchanger of the present invention.

Further details of the auxiliary heat exchanger 118 are illustrated in FIG. 6. Heat exchanger 118 includes a generally cylindrical body portion 136 for conducting air from the blower 82. A plurality of external cooling fins 138 extend outwardly from body 136 to provide a larger surface area for contact with the air from fan 132 moving in the direction of arrow 134. Heat exchanger 118 also includes a plurality of inwardly extending fins 140 to provide an increased surface area for contacting the air moving from blower 82 toward the main heat exchanger 116. Illustratively, heat exchanger 118 is made from a metal material which conducts heat well. Auxiliary heat exchanger 118 pre-cools the air flowing from blower 82 prior to the air entering main heat exchanger 116.

Figure 7:
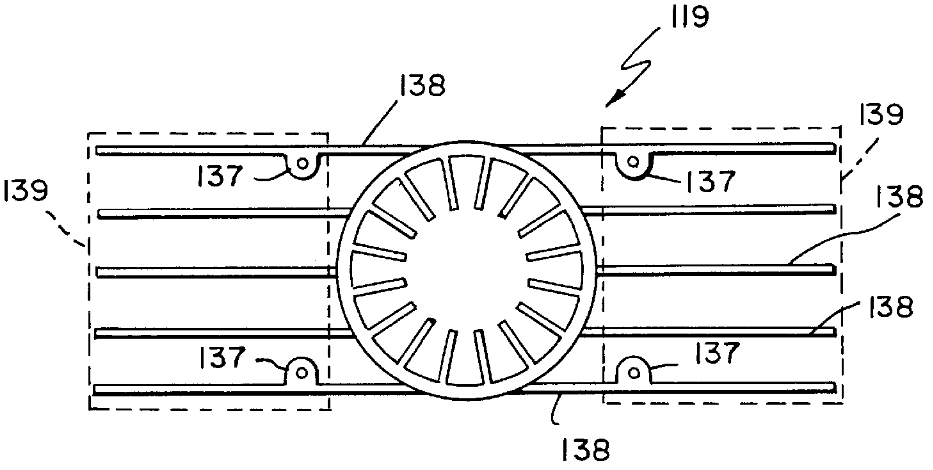
FIG. 7 is a sectional view of another embodiment of the auxiliary heat exchanger.

Another embodiment of the auxiliary heat exchanger is illustrated in FIG. 7. Those numbers referenced by numbers similar to FIG. 6 perform the same or similar function. In the FIG. 7 embodiment, the outermost cooling fins 138 of heat exchanger 119 are formed to include mounting portions 137 which are configured to receive fasteners (not shown) for mounting a pair of fans illustrated by dotted lines 139 directly to an end portion of the heat exchanger 119. The fans 139 may be used in place of fan 132 illustrated in FIG. 4. By directly mounting the fans 139 to a top end of heat exchanger 119, air flow is improved across all of the cooling fins 138.

Depending upon the temperature sensed by sensor 128, the main heat exchanger 116, heater 122, and fan 132 can be controlled by electronic controller 84 to maintain the temperature of the fluidized section 124 at a desired level.

Further control of the various air zones of head section bladders 22, air bladders 26 and 28, and fluidized section 24 are disclosed in U.S. Pat. No. 5,623,736.

Figure 8:
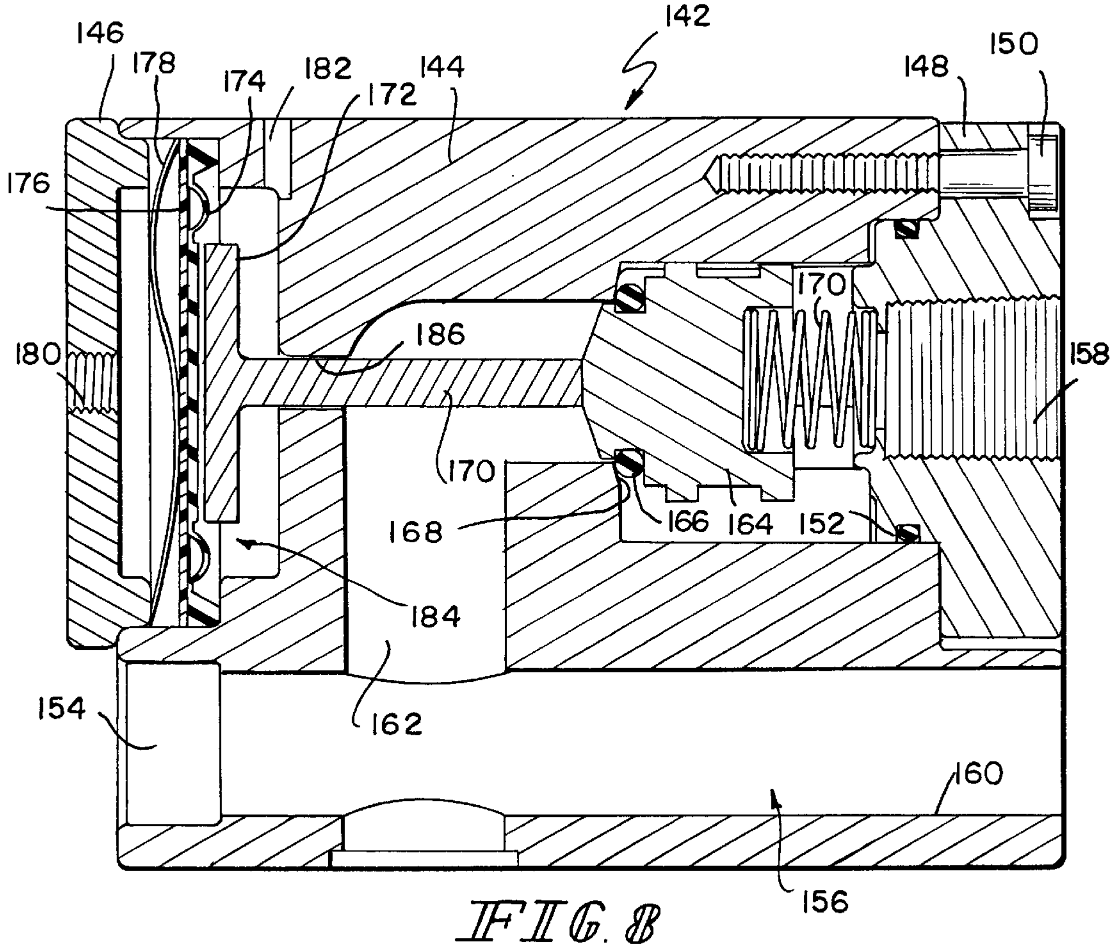
FIG. 8 is a sectional view taken through a check valve used in controlling air flow from the air zones of the support surface.

The various air zones are provided with a pilot-operated check valve 142 in each pressure line downstream of a pressure control valve as discussed in detail in U.S. Pat. No. 5,623,736. The check valve 142 of the present invention illustrated in FIG. 8 is an improvement over the pilot operated check valve disclosed in the '736 patent. The check valve 142 is configured to close upon interruption of air supply from the blower 82 to maintain air within the various air zones of the bed 10. The check valve 142 includes a body 144 and end caps 146 and 148. End cap 146 is sealed to body 144 with an adhesive, threads, or press fit relationship. End cap 148 is coupled to body 144 by suitable fasteners 150 and sealed with O-ring 152. An air inlet 154 leads to passageway 156 formed in body 144. An air outlet 158 is formed in cap 148 and opposite end 160 of passageway 156 may be plugged or coupled to a sensor. Outlet 158 is coupled to passageway 156 by another passageway 162. Valve 142 includes a movable valve body 164 having an O-ring seal 166 for engaging in a valve seat 168. The valve seat 168 of the present invention is illustratively tapered downwardly at an angle of about 15° to improve sealing between the valve seat 168 and the O-ring seal 166 when the valve body 164 is moved to the closed position as illustrated in FIG. 8. A spring 170 is located between valve body 164 and cap 148. A push rod 170 is coupled to valve body 164. Push rod has an enlarged head 172 located within region 184 of valve 142.

Valve 142 further includes a diaphragm 174, a circular shim 176, and a wave washer 178. Cap 146 is formed to include a port 180. Pressure from one of the air zones of bed 10 is coupled to inlet port 154. Port 180 is coupled to an air manifold from blower 82. In operation, pilot air enters port 180 and pushes against diaphragm 174 causing push rod 170 to unseat the O-ring 166 from valve seat 168. Therefore, air entering through inlet 154 can pass through passageways 156 and 162 and exit through outlet 158 as long as blower pressure from the manifold is supplied to port 180.

If the pilot air from blower is interrupted for any reason, spring 170 biases valve body 164 and O-ring 166 against valve seat 168 to prevent air from passing from inlet 154 to outlet 158 in order to maintain air in the various air zones of the bed 10. The improved valve 142 of the present invention includes an aperture 182 formed in body 144 in communication with region 184. Aperture 182 forms an air discharge path from region 184 to the atmosphere. Therefore, any air which might leak past push rod 170 through aperture 186 from inlet 154 is discharged to atmosphere. This prevents pressure from building up in region 184 which can equalize the pressure on diaphragm 174 from port 180, thereby causing the spring 170 to close the valve body 164 while the blower 82 is still in operation.

Figure 9:
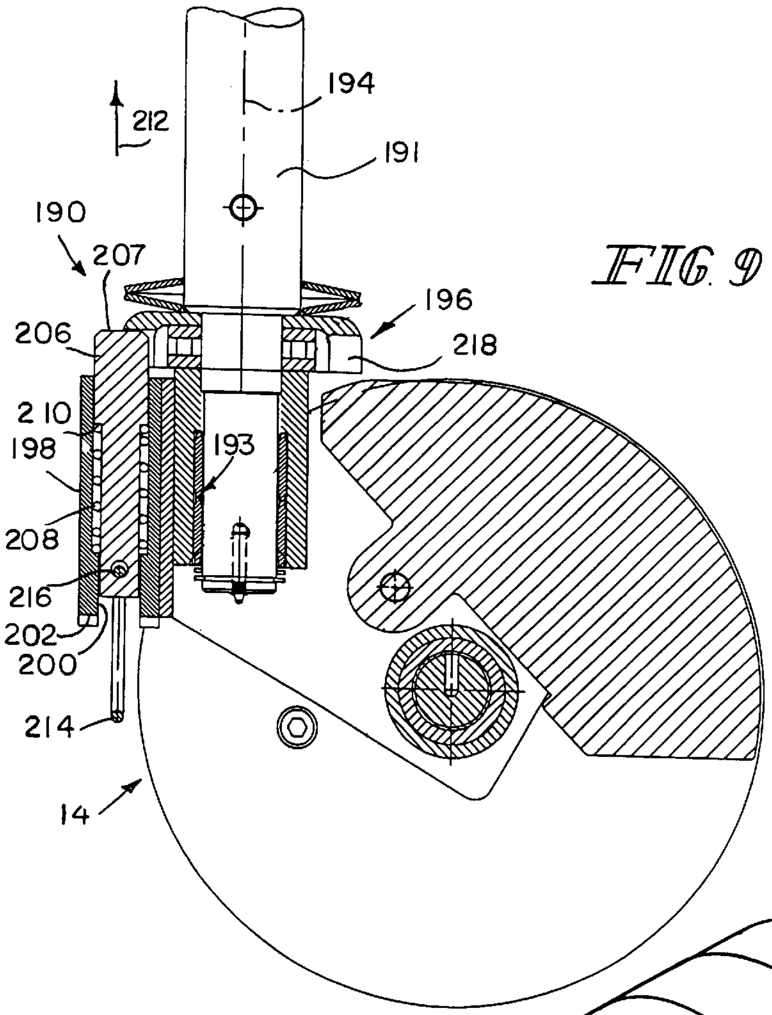
FIG. 9 is a sectional view illustrating a caster locking apparatus of the present invention.
Figure 10:
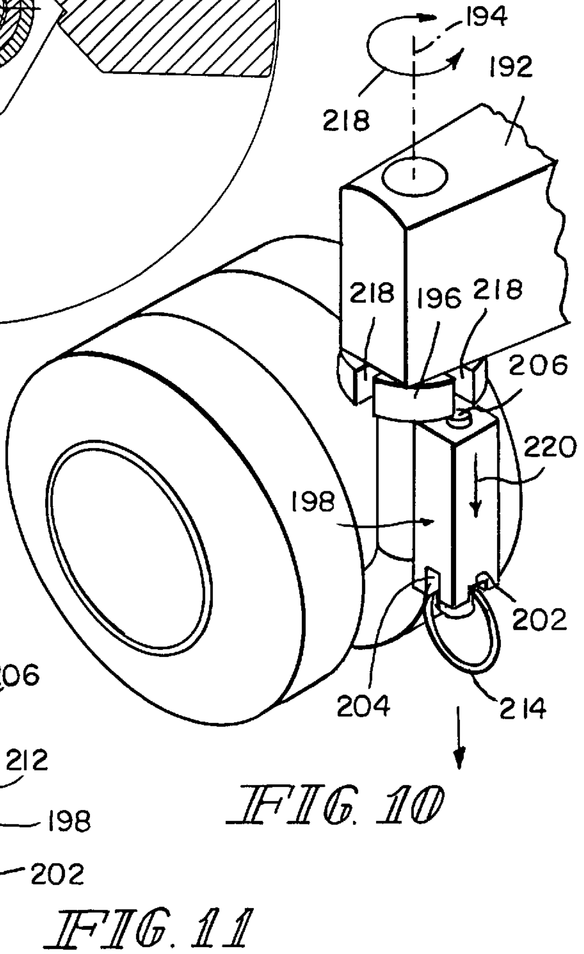
FIG. 10 is a perspective view of a caster of the bed including the improved locking mechanism in an unlocked position.
Figure 11:
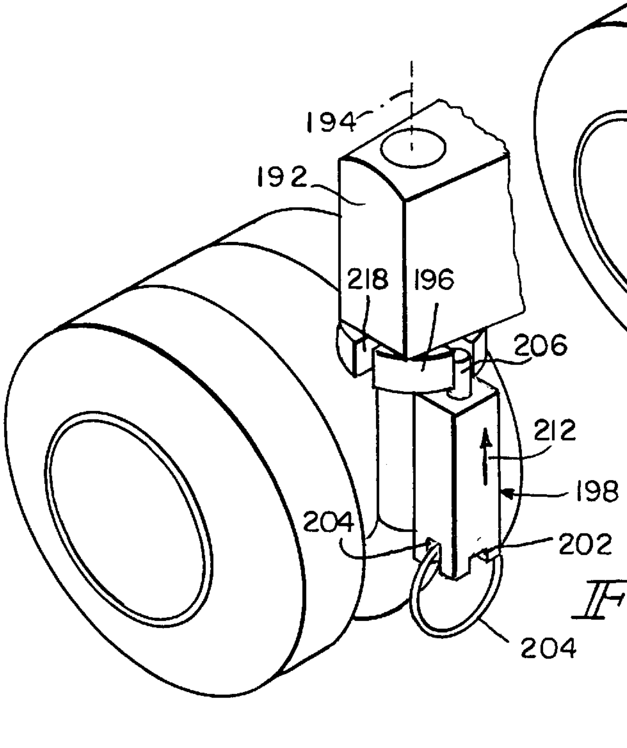
FIG. 11 is a perspective view of the caster locking mechanism in a locked position.

An improved caster locking apparatus 190 is illustrated in FIGS. 9–11. As shown in FIG. 9, a stem 191 is configured to be coupled to frame member 192 of base 12. Caster 14 is rotatably coupled to stem 191 by bearing 193. Therefore, caster 14 rotates in a conventional manner about axis 194. A hub 196 is rigidly coupled to stem 191. Caster 14 includes a housing 198 rigidly coupled to caster 14 to rotate with caster 14 about axis 194. Housing 198 includes an interior region 200. Housing 198 is also includes a pair of first notched portions 202 formed in opposite sidewalls of the housing 198 and a pair of second notched portions 204 formed in the other on spaced apart sidewalls of the housing 198.

A locking pin 206 is located within interior region 200 of housing 198. A spring 208 is also located within interior region 200 of housing 198. Spring 208 is configured to engage a flange within interior region 200 to apply a biasing force to a flange 210 of pin 206 to bias the pin 206 upwardly in the direction of arrow 212 within housing 198. A ring 214 is configured to be located through an aperture 216 of pin 206 to provide a bottom stop. It is understood that a cross pin or other type of stop may be used in place of ring 214.

Hub 196 is formed to include spaced apart notched sections 218 configured to receive a top end 207 of pin 206 to lock the caster 14 against rotational movement about axis 194. Illustratively, notched sections 218 are spaced every 90° around hub 196. The locking mechanism 190 is illustrated in an unlocked position in FIG. 10. In the unlocked position, the ring 214 is oriented to engage the lower notched portions 202 of housing 198 so that the spring 208 is compressed within housing 198 and a top end 207 of locking pin 206 is located at or below a top opening 201 of housing 198. Therefore, the caster 114 and housing 198 are free to rotate relative to hub 196 and frame member 192 in the direction of double headed arrow 218.

In order to move the locking mechanism 190 to a locked position, an operator pulls ring 214 and pin 206 downwardly in the direction of arrow 220 in FIG. 10. The operator then rotates the ring 90° and releases the ring 214 so that the ring 214 moves upwardly in the direction of arrow 212 and engages the notched portions 204 which are located closer to top opening 201 of housing 198. This permits the spring 208 to move the pin 206 upwardly in the direction of arrow 212 so that the top end 207 of pin 206 enters a notched section 218 of hub 196 as shown in FIGS. 9 and 11. This movement of pin 206 into a notch 218 prevents rotational movement of caster 14 relative to frame member 192 and hub 196 about axis 194.

Although the invention has been described in detail with reference to certain illustrative embodiments, variations and modifications exist within the scope and spirit of the present invention as defined in the following claims.

What is claimed is:

1. A pilot operated check valve configured to be positioned inside a fluid supply tube connected between an air supply manifold and an air zone located on a support surface of a bed, the pilot operated check valve comprising:

a body having an air inlet and an air outlet connected by an air passageway;

a valve member configured to move between an open position and a closed position to block air flow through the passageway;

a push, rod having a first end coupled to the valve member to unseat the valve member when the valve member is in its open position and a second end;

a diaphragm located in a chamber of the body adjacent the second end of the push rod; and an inlet port configured to be coupled to the manifold to admit pressure against the diaphragm, the body being formed to include a vent hole located on an opposite side of the diaphragm from the inlet port, the vent hole being formed in communication with the chamber to permit air passing into the chamber from the air passageway to vent to atmosphere.

* * * * *